Figure 1:
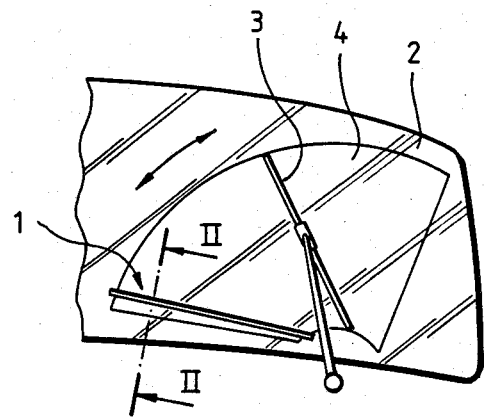

United States Patent [19]

Paretskoi

[11] Patent Number: 4,616,376
[45] Date of Patent: Oct. 14, 1986

[54] MEANS FOR CLEANING A BLADE OF A WINDOW GLASS WIPER OF A VEHICLE

[75] Inventor: Mikko Paretskoi, Vantaa, Finland
[73] Assignee: Turvaura OY, Helsinki, Finland
[21] Appl. No.: 807,984
[22] Filed: Dec. 12, 1985
[51] Int. Cl.⁴ ............................................. B60S 1/02
[52] U.S. Cl. ................. 15/250 R; 15/250.36; 296/84 R
[58] Field of Search .......... 15/250 R, 250.36, 250.16, 15/250.17, 250.19; 296/84 R

[56] References Cited

U.S. PATENT DOCUMENTS 1,732,417  10/1929  Pritchard ........................... 15/250 R
3,908,222   9/1975  Scott ................................. 15/250 R
4,378,484   3/1983  Kunert .............................. 15/250 R

FOREIGN PATENT DOCUMENTS 50229   9/1975  Finland .
51779  12/1976  Finland .

Primary Examiner—Peter Feldman
Attorney, Agent, or Firm—Hoffman, Dilworth, Barrese & Baron

[57] ABSTRACT

The invention relates to a means for cleaning a blade of a window glass wiper of a vehicle. The means comprises at least one wiping edge (6) provided on the outer surface of the glass (2) within the area of motion of the wiper blade (6), whereby the blade (3) slides across the wiping edge when the wiper is on operation. The wiping edge (6) is formed by an edge of a groove provided on the surface of the glass (2). In order to reduce the striking forces acting on the drive mechanism of the wiper and to diminish wearing of the blade itself, the bottom of the groove (11) is provided with a ridge (5) extending longitudinally with respect to the groove essentially in the middle thereof. The upper edge of the ridge is rounded and has a lower position than the outer surface of the glass (2).

2 Claims, 2 Drawing Figures

MEANS FOR CLEANING A BLADE OF A WINDOW GLASS WIPER OF A VEHICLE

The invention relates to a means for cleaning a blade of a window glass wiper of a vehicle, comprising at least one wiping edge provided on the outer surface of the glass within the area of motion of the wiper blade, whereby said blade slides across the wiping edge when the wiper is on operation, which wiping edge is formed by an edge of a groove provided on the surface of the glass.

As motorists well know, dirt, pitch and other such accumulations tend to adhere to the wiping surfaces of the glass wiper blades when driving in the streets and on the roads in rainy weather and particularly when the streets and roads are muddy, whereby the wiping surfaces of the blades, initially smooth, become uneven, thus considerably decreasing the wiping efficiency of the blades.

Different kinds of cleaning means are commercially available for removing this kind of accumulations of dirt adhering to the blades so as to restore the smoothness of the wiping surfaces of the blades, which cleaning means usually comprise a narrow slit defined by opposing scouring faces. Such means are intended to be drawn along the wiping edge of the blade after the wiping edge has been placed in the slit. The to-and-fro motion taking place along the wiping edge scours or scrapes the blade clean. A disadvantage of such cleaning means, however, is that the use thereof requires measures carried out from the outside of the vehicle, i.e. said means cannot be used during driving when the blades most need cleaning.

Also separate strips or bands fixed on the outer surface of the windshield within the area of motion of the blade have been previously suggested for the cleaning of the wiper blades, whereby the blade slides across said strips or bands. This kind of strips or bands are intended to be fixed by glueing on the windshield surface, whereby they are not always reliably maintained in place. Such strips are often either provided with an abrasive surface, i.e. they are made of a strip of an abrasive band, or they can be provided with an abrasive surface layer, such as an abrasive particle coating. The abrasive effect directed to the blade, however, causes the blade to become scratched, whereby its cleaning effect is reduced. Strips or bands fixed on the outer surface of the glass, over which the blade must slide, also easily make the blade jump particularly when the wipers move at a high rate, because the strips or bands project from the surface of the windshield.

For the elimination of the above problems, a cleaning means has been previously developed, which is formed by a groove provided on the surface of the glass. The edges of the groove thus form a wiping edge or wiping edges, over which the blade slides, whereby said edge(s) wipe(s) the blade clean. Said known cleaning means is described in Finnish Patent Specification No. 50,229. A disadvantage of this known solution, however, is that the blade is not cleaned in the best possible way, especially in case two adjacent grooves positioned in parallel with each other are used. This is because the function of the groove is based on the fact that the dirt detached from the wiper blade by the edges of the groove remains in the groove, whereby the dirt is flushed off the groove during the next wiping by the water brought with the blade. If there are two grooves positioned adjacent each other, the flush water mostly remains in the upper groove, whereby it does not in the best possible way reach the lower groove, i.e. the one positioned at a shorter distance from the lower edge of the windshield. Besides, the grooves strain the driving mechanism of the wipers to some extent, for the blade in a way falls unnecessarily deep on the bottom of the groove when it passes over the groove, whereby the blade, of course, must also ascend back to the surface of the glass when the blade moves over the groove. Said up-and-down movement and the forward movement of the blade have in combination a small disadvantageous effect on the driving mechanism of the wipers and the blades themselves, even though the depths of the grooves are small, e.g. less than 1 mm.

The object of the invention is to provide a cleaning means which avoids the disadvantages of the previously used solutions. This is achieved by means of a device according to the invention, which is characterized in that the bottom of the groove is provided with a ridge extending longitudinally with respect to the groove essentially in the middle thereof, whereby the upper edge of said ridge is rounded and has a lower position than the outer surface of the glass.

The invention is advantageous mainly in that the groove is extremely efficiently kept clean, because the water easily spreads over the ridge. In addition, the ridge prevents the blade from falling unnecessarily deep, which substantially reduces the strains exerted on the driving mechanism of the wipers or the blade itself. Further, all the advantages of Finnish Patent Specification No. 50,229 are maintained in the invention, i.e. the efficient cleaning of the blades, the reliable securing in place of the cleaning means, etc.

Figure 2:
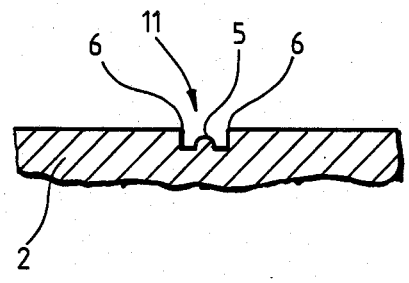

The invention will be more closely described in the following by means of one preferred embodiment disclosed in the attached drawing, whereby FIG. 1 is a general view of a portion of a vehicle windshield provided with a cleaning means according to the invention, and FIG. 2 is a section along the line II—II in FIG. 1 on an enlarged scale.

FIG. 1 shows a cleaning means 1 which is provided on the outer surface of a vehicle windshield 2 above the lower extreme position of the area of motion 4 of the blade. Said cleaning means can be provided on the surface of the windhsield e.g. by grinding. The edges of the groove thus act as wiping edges. Said matters all belong to the prior art disclosed in e.g. Finnish Patent Specification No. 50,229 and Finnish Patent Specification No. 51,779, in which a grinding device is disclosed which grinds a groove on an arched glass surface, wherefore these matters are not more closely described here.

The cleaning means 1 of FIG. 1 is thus formed by a groove 11 having a certain kind of cross-sectional area in accordance with the invention. Said cross-sectional area is shown on an enlarged scale in FIG. 2. A ridge 5 extending in the longitudinal direction of the groove is provided at the bottom of said groove 11. Said ridge 5 is essentially positioned in the middle of the bottom of the groove 11. Besides, the upper edge of the ridge 5 is rounded and has a lower position than the outer surface of the glass 2. In view of the operation of the invention, it is of essential importance that the length of the ridge 5 is at least equal to the length of the wiper blade. It is nevertheless advantageous with respect to the practical manufacture that the length of the ridge equals to the length of the groove 11, because the ridge thereby prevents the blade from falling on the bottom of the groove. The entire cleaning means can be manufactured through a single step e.g. by means of a device disclosed in Finnish Patent Specification No. 51,779. The grinding part(s) of the device must, of course, be so shaped that the resulting groove is of the above-described type, i.e. provided with a ridge 5. Both longitudinal edges of the groove 11 form wiping edges 6 in a manner known per se.

When the wiper blade is passed by the cleaning means 1, both surfaces of the blade are wiped clean by the wiping edges 6. Both said surfaces get wiped on account of the to-and-fro motion of the wiper, which motion is shown in FIG. 1 by an arrow. Dirt detached from the blade is gathered in the groove and is not any more wiped back on the windshield within the field of vision of the driver. The next wiping of the blade brings water with it, which water flushes the dirt off the groove 11. Thus the ridge 5 prevents the blade from falling on the bottom of the groove 11 when the blade moves across the groove. The wiper moves softly, stroke-like forces acting on the blade and, consequently, on the wiper mechanism being eliminated as efficiently as possible. The water brought with the wiper is efficiently spread beyond the ridge 5, too, as the crest of the ridge has a lower position than the surface of the glass, whereby the entire groove 11 is extremely efficiently kept clean.

The above example is by no means intended to restrict the invention, but the invention can be modified within the scope of the claims in various ways. Accordingly, it is obvious that the cleaning means or the parts thereof, the ridge 5, e.g., do not need to be exactly similar to those shown in the figures, but also other shapes can be used. As to FIG. 2, it is also to be noted that the size of the groove 11 is considerably exaggerated. The depth of the groove is less than 1 mm and the width can be about 3 mm. In the example of the figure, there is only one groove 11 provided for each wiper, while it is obvious that also two parallel grooves positioned adjacent to and spaced from each other can be used. The invention can also be used in other connections than with a windshield. An example thereon would be a groove provided on the back glass of a car, across which groove a back glass wiper is displaced. The groove according to the invention can, of course, also be manufactured directly in connection with the manufacture of the glass, etc.

I claim:

1. Means for cleaning a blade of a window glass wiper of a vehicle, comprising at least one wiping edge (6) provided on the outer surface of the glass (2) within the area of motion of the wiper blade (3), whereby said blade (3) slides across the wiping edge when the wiper is on operation, which wiping edge (6) is formed by an edge of a groove provided on the surface of the glass (2), characterized in that the bottom of the groove (11) is provided with a ridge (5) extending longitudinally with respect to the groove essentially in the middle thereof, whereby the upper edge of said ridge (5) is rounded and has a lower position than the outer surface of the glass (2).

2. Means according to claim 1, characterized in that said ridge (5) is as long as the groove (11).

* * * * *